United States Patent [19]

Benedict et al.

[11] 3,961,917
[45] June 8, 1976

[54] METHOD OF INDEPENDENTLY OPERATING A GROUP OF STAGES WITHIN A DIFFUSION CASCADE

[75] Inventors: Manson Benedict, Westfield; Allen J. Fruit, Millington; Horace B. Levey, Bloomfield, all of N.J.

[73] Assignee: The United States of America as represented by the United States Energy Research and Development Administration, Washington, D.C.

[22] Filed: July 13, 1949

[21] Appl. No.: 104,404

[52] U.S. Cl. .................................. 55/16; 55/158
[51] Int. Cl.² ............................................. B01D 59/12
[58] Field of Search ............... 183/2.2, 115; 55/16, 55/158

[56] References Cited
UNITED STATES PATENTS 2,609,059   9/1952   Benedict ............................... 55/16
3,208,197   9/1965   Simon et al. .......................... 55/16

*Primary Examiner*—Edward A. Miller
*Attorney, Agent, or Firm*—Dean E. Carlson; Leonard Belkin

EXEMPLARY CLAIM

1. A method of operating a group of the diffusion stages of a productive diffusion cascade with countercurrent flow, said group comprising a top and a bottom stage, which comprises isolating said group from said cascade, circulating the diffused gas produced in said top stage to the feed of said bottom stage while at the same time circulating the undiffused gas from said bottom stage to the feed of said top stage whereby major changes in inventory distribution within the group of stages are prevented.

4 Claims, 1 Drawing Figure

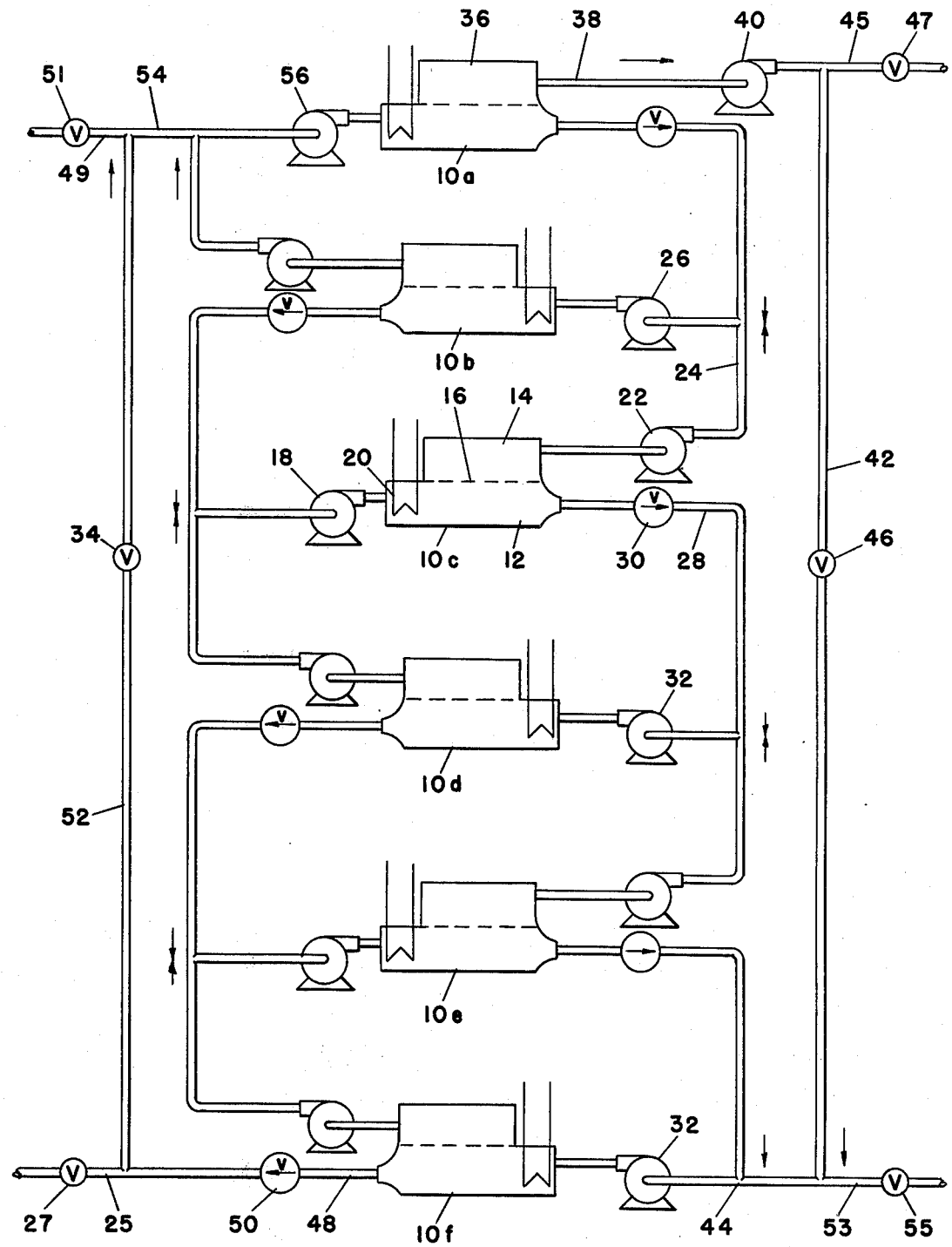

METHOD OF INDEPENDENTLY OPERATING A GROUP OF STAGES WITHIN A DIFFUSION CASCADE

This invention relates to an improvement in the operation of a countercurrent gaseous diffusion cascade.

In recent years the diffusion method of separating gases or vapors which were difficultly separable by other methods has reached a relatively high stage of development. The method is extremely advantageous in separating gases or vapors which differ from each other only in molecular or atomic weight. Typical examples of such gases or vapors are, of course, the isotopic species of such elements as chlorine, mercury or of such compounds as uranium hexafluoride.

In carrying out the diffusion method a mixture of gases to be separated is flowed under carefully controlled conditions of pressure, temperature, etc. across one surface of a finely porous diffusion membrane. Gas of relatively low molecular weight tends to diffuse through the membrane more rapidly than the gas of higher molecular weight. As a result the gas passing through the membrane is enriched with respect to the lighter component. The gas passing through the membrane must, of course, be removed from the surface of the membrane in order that the diffusion process continue. Again on the diffused gas side of the membrane the conditions established in the gas must be carefully controlled, that is, temperature, pressure and the like. The control of the conditions in the gas streams both of the original gaseous mixture, of the gas diffusing through the membrane and of the undiffused gas must be carried out with a high degree of precision.

Where the gases to be separated differ from each other by a very small percentage of their molecular or atomic weights or when one of the gases to be separated is present only in a very small concentration, a large cascade of diffusion membranes is generally required, the stages in such a cascade being numbered possibly in the thousands.

The usual diffusion cascade is operated with countercurrent flow. That is, the product of each stage enriched in light component provides a portion of the feed for the next succeeding stage in the cascade; the product of each stage depleted with respect to the light component is recirculated to provide the remainder of the feed for the next preceding stage. Thus, the feed for each stage comprises the lower molecular weight product of the next preceding stage together with the higher molecular weight product of the next succeeding stage. The general theory of the operation of such cascades is described in articles by M. Benedict, Transactions of the American Institute of Chemical Engineers, 43, 41 (1947) and by K. Cohen in "The Science and Engineering of Nuclear Power", Volume 2, edited by C. Goodman, Addison-Wesley, 1949.

In the operation of a large diffusion cascade of the type described, it often becomes desirable to operate a small group of stages independently of the remainder of the cascade. Such an occasion might arise in the event of a failure of some portion of the equipment involved in the operation of the group. In this event it is desirable that the group of stages be by-passed while repairs are made. Another such occasion arises where a group of stages is to be tested prior to its connection into the main part of the cascade. This may occur where a stand-by group is to be used in the place of a group of stages already in the cascade or under other circumstances. The normal method of operating such a portion of a cascade would be to employ what is often termed total reflux conditions. That is to say, the product of the top stage of the group is recirculated to provide feed for the top stage while the bottoms produced in the bottom stage of the group are recirculated to provide feed for the bottom stage of the group. The inventory of the group of stages thus remains unchanged and the group of stages may be said to be idling. However, when such a group of stages is operated in this manner for any length of time a considerable problem arises in attempting to connect the group of stages in its normal position in the cascade.

The problem arises in this way. There is usually in the cascade a certain amount of diluent gas which is of a substantially different molecular weight from the gases being separated. When the entire cascade is operating normally, this diluent gas is distributed throughout the cascade by controlling the conditions in the cascade. Provision may be made for removal of the diluent gas at intervals in the cascade by means of auxiliary apparatus designed and operated specifically to remove the diluent gas. However, where there is no such provision as, for example, in a relatively small group of stages, and the stages are operated under the conditions of total reflux described above, this diluent gas becomes concentrated either in the top stage or bottom stage of the group depending upon whether it is materially lighter or heavier than the gases being separated. At the same time the gases to be separated which will generally have nearly equal molecular weights will collect at the other end of the group of stages. When the group of stages is then joined to the remainder of the cascade the gas collected in the top and in the bottom stages of the idling group is immediately pumped into the remainder of the cascade. Since the diluent gas is substantially different in molecular weight from the gas in the remainder of the cascade there will be a sudden surge of this gas upward or downward through the cascade depending upon its relative molecular weight. Such a surge tends to upset the rather delicate equilibrium under which the cascade operates. Moreover, on being pumped into the cascade the diluent gas, generally having substantially different physical properties from the gas mixture in the cascade proper, would cause sudden changes in the load on the pumps and in the actions of the flow and pressure controllers as it passes through the cascade.

Accordingly, a general object is to provide a method of operating a cascaded group of gaseous diffusion stages without permitting a diluent gas of different molecular weight to be concentrated in the top or bottom stages.

Another object of this invention is to provide a method of operating an idling group of diffusion stages without causing a major change in the inventory distribution of the idling group.

A specific object of the invention is to prevent surges of gas in a cascade of diffusion stages when a small group of such stages is connected into the cascade.

Other objects will become apparent in the description following.

Generally speaking, the method of the present invention comprises operating a group of diffusion stages of the type described under its normal operating conditions while at the same time circulating the diffused gas produced in the top stage of the group to the feed of the bottom stage of the group and circulating the undiffused gas produced in the bottom stage to the feed of the top stage.

The invention is illustrated in the accompanying drawing which shows diagrammatically a group of stages of the type to which the present invention is directed. For convenience six stages have been shown but it will be realized that a larger or smaller number may be employed. Similarly, the invention should not be limited to any particular types of apparatus, but is generally applicable to any countercurrent gaseous diffusion cascade.

As shown in the drawing, the group of cascaded stages comprises six diffuser stages, 10 a through f, with 10a the top stage normally treating material of lower molecular weight than 10f, the bottom stage. Each of the stages, such as 10c, is divided into a zone 12 of high pressure and a zone 14 of low pressure. The two zones are separated by a diffusion membrane 16 which may be in any convenient form. The gases to be separated in each stage are caused to flow into the high pressure zone 12 by means of a pump or blower 18 upstream of the stage. These gases are discharged from the pump over a cooling coil 20 to remove the heat caused by the pumping. The gases in the high pressure zone 12 then flow across one surface of the diffusion membrane 16 so that a portion of the gases diffuses through the membrane into the low pressure zone 14 and is enriched with respect to the light component. The diffused gas is then withdrawn from the diffuser stage by means of the booster pump 22 and flows through a conduit 24 to the inlet of the upstream pump 26 of the next succeeding diffuser stage 10b. The undiffused gas flows from high pressure zone 12 of the diffuser stage 10c through conduit 28 containing a flow controller 30 to the inlet of the upstream pump 32 discharging gas into the next preceding diffuser stage 10d. Thus the feed for each stage (such as 10c) consists of the diffused gas produced in the next preceding stage, (10d) together with the undiffused gas of the next succeeding stage (10b).

The group of stages shown is normally connected into the main body of the cascade proper in the following manner: The diffused gas produced in the top stage 10a of the group is flowed into the remainder of the cascade through conduit 45 containing valve 47. The top stage 10a receives undiffused gas from the cascade proper through conduit 49 containing valve 51. The bottom stage 10f of the group receives diffused gas from a stage of the cascade proper through conduit 53 containing valve 55 while the undiffused gas from stage 10f is delivered through the conduit 25 containing valve 27 to the same stage of the cascade. Recycle conduits 42 and 52 containing valves 46 and 34, respectively, are provided to interconnect conduits 45 and 53 and conduits 25 and 49, respectively.

When it is desired to operate this group of stages in isolation from the cascade proper, the valves 55, 27, 47 and 51 are all closed. Then, in accordance with this invention, the valves 46 and 34 in the recycle conduits 42 and 52, respectively, are opened. The diffused gas produced in the top stage 10a is withdrawn from the low pressure zone 36 of that stage and pumped by means of the booster pump 40 through recycle conduit 42 to the upstream pump 32 of the bottom stage 10f of the group of cascades. The undiffused gas produced in the bottom stage 10f of the cascade is withdrawn through the conduit 48 containing flow controller 50 and flows through conduits 52 and 54 to the inlet of the upstream pump 56 of the top stage 10a of the group.

It will be evident now that each of the stages in the group, when operating as described in accordance with this invention, has similar connections and that all of the stages are connected together in what might be termed a ring, that is, there is no longer any top or bottom stage. The effect of this is to distribute in a uniform manner throughout the group of stages each of the components of the gaseous mixture contained in the group of stages. After these stages have been operated in this manner for a relatively short time, the concentrations and inventories in all the high pressure zones and in all the low pressure zones are substantially equalized.

In order to achieve the foregoing effects as conveniently and as rapidly as possible it is desirable that the circulation of the gases between the top and bottom stages be carried out at a constant rate. This constant rate is preferably the production rate at which the stages are normally operated. Further, it is preferred to operate the idling group of stages in accordance with this invention under the equilibrium conditions generally used when these stages are in the cascade.

The advantages of this invention are manifest. Since each of the individual gases present in the group of stages is distributed uniformly throughout the group, the connection of the group of stages into the remainder of the cascade may be accomplished with substantially no displacement of the conditions in the cascade proper. Further, since the pumps in adjacent portions of the cascade will in general be similar to those in the by-passed group of stages, there will be no change in the operation of the pumps in the remainder of the cascade when the by-passed group is reconnected. A further advantage is achieved by reason of the fact that the group of by-passed stages when operated in accordance with this invention, is very close to the equilibrium conditions in the cascade. Therefore, when this by-passed portion is again connected to the cascade it comes to equilibrium with the remainder of the cascade in a very short time.

Alternatives will be apparent to those skilled in the art.

Since many embodiments might be made of the present invention and since many changes might be made in the embodiment described, it is to be understood that the foregoing description is to be interpreted as illustrative only and not in a limiting sense.

We claim:

1. A method of operating a group of the diffusion stages of a productive diffusion cascade with countercurrent flow, said group comprising a top and a bottom stage, which comprises isolating said group from said cascade, circulating the diffused gas produced in said top stage to the feed of said bottom stage while at the same time circulating the undiffused gas from said bottom stage to the feed of said top stage whereby major changes in inventory distribution within the group of stages are prevented.

2. A method of operating a group of the stages of a countercurrent gaseous diffusion cascade, said group comprising a top and a bottom stage, without changing the gross inventory of said group and without causing major changes in inventory distribution, which comprises isolating said group from said cascade, then concurrently withdrawing the diffused gas produced in said top stage at a constant rate, withdrawing undiffused gas from said bottom stage at a constant rate, returning said undiffused gas as feed to said top stage at a constant rate and returning said diffused gas to the cascade as feed to the bottom stage at a constant rate.

3. A method of operating a group of stages of a countercurrent gaseous diffusion cascade, said group comprising a top and bottom stage, without changing the gross inventory of the group whereby major changes in inventory distribution within the group are prevented, which comprises isolating said group from said cascade, then concurrently withdrawing the diffused gas produced in said top stage at the normal production rate, withdrawing undiffused gas from said bottom stage at the normal production rate, returning all of said undiffused gas as feed to the top stage at a constant rate and returning all of said diffused gas to the cascade as feed to the bottom stage at a constant rate.

4. A method of operating a group of stages of a countercurrent gaseous diffusion cascade, said group comprising a top and a bottom stage, without changing the gross inventory of said cascade group whereby major changes in the inventory distribution in said group are prevented which comprises isolating said group from said cascade, then operating the group at its normal equilibrium rates to produce a top-stage diffused-gas product and a bottom-stage undiffused-gas product, and at the same time circulating said diffused-gas product as feed to the bottom stage and circulating the undiffused-gas product as feed to the top stage, the rates of circulation being sufficient to maintain equilibrium conditions of operation in the cascade.

* * * * *